United States Patent [19]

Sheldon

[11] Patent Number: 4,513,833

[45] Date of Patent: Apr. 30, 1985

[54] CONTROLLED VEHICLE DAMPING

[76] Inventor: Daniel F. Sheldon, 23638 Oak, Dearborn, Mich. 48128

[21] Appl. No.: 482,694

[22] Filed: Apr. 6, 1983

[51] Int. Cl.³ .............................................. B62D 55/00
[52] U.S. Cl. .................... 180/9.1; 188/299; 188/322.14; 280/705
[58] Field of Search ............... 180/9.58, 9.54, 9.5, 180/9.1, 169; 267/11 A, 64.22, 64.18; 280/702, 707, 714, 705; 343/7 VC, 7 VM; 188/299, 322.14

[56] References Cited

U.S. PATENT DOCUMENTS

| | | | |
|---|---|---|---|
| 3,003,783 | 10/1961 | Brueder | 280/124 |
| 3,374,005 | 3/1968 | Donlon et al. | 280/705 |
| 3,459,439 | 8/1969 | Sinclair et al. | 280/705 X |
| 3,625,303 | 12/1971 | Cameron | 180/169 X |
| 3,892,298 | 7/1975 | Blatt | 267/64.22 X |
| 4,145,073 | 3/1979 | McLuckie et al. | 280/714 X |
| 4,156,536 | 5/1979 | Brandstadter | 280/714 X |
| 4,333,668 | 6/1982 | Hendrickson et al. | 280/707 X |
| 4,373,744 | 2/1983 | Glaze | 280/707 |

Primary Examiner—Joseph F. Peters, Jr.
Assistant Examiner—Charles R. Watts
Attorney, Agent, or Firm—Peter A. Taucher; John E. McRae; Robert P. Gibson

[57] ABSTRACT

A vehicle shock absorber wherein hydraulic flow out of the shock absorber chamber is controlled by a metering valve that is operated by an electrical power operator. The shock absorber dampener characteristics can be instantaneously changed by the driver of the vehicle or automatically by a computer, according to the value of the electrical signal applied to the metering valve power operator.

5 Claims, 7 Drawing Figures

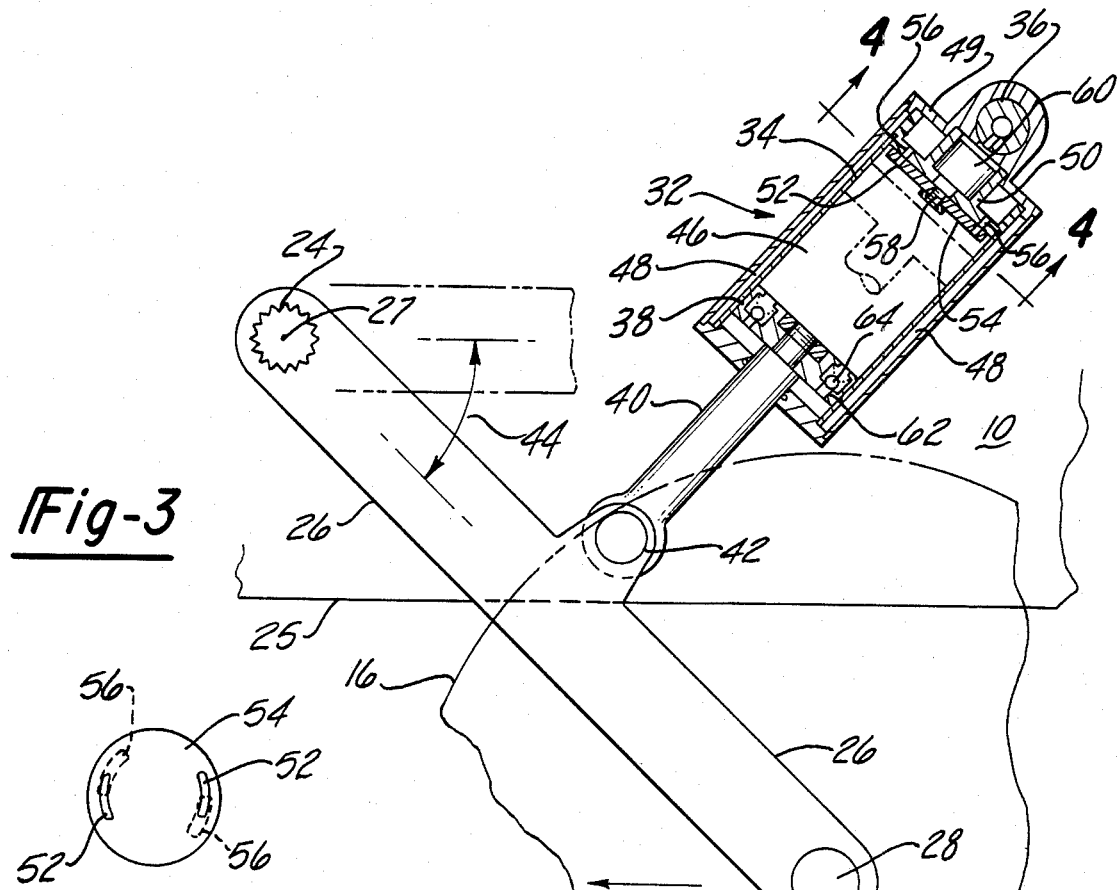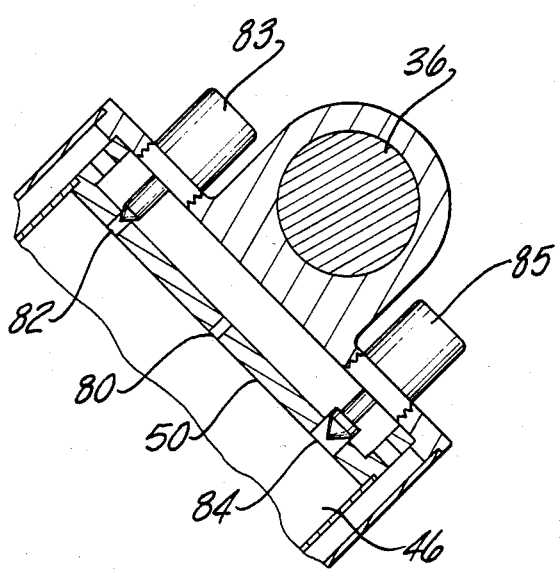

CONTROLLED VEHICLE DAMPING

GOVERNMENT INTEREST

The invention described herein may be manufactured, used, and licensed by or for the Government for governmental purposes without payment to me of any royalty thereon.

BACKGROUND AND SUMMARY OF INVENTION

This invention relates to shock absorbers for land vehicles, especially tracked military vehicles such as tanks and personnel carriers. Certain features of the invention could be applied to wheeled vehicles used off the highways, e.g. military trucks. A principal aim of the invention is to provide a hyraulic shock absorber wherein the metered flow out of the shock absorber chamber can be varied or regulated in accordance with different types of terrain and different vehicle speeds.

In conception of the invention it was realized that vehicle shock absorbers should exhibit higher damping at low terrain irregularity input frequencies and lower damping at high terrain irregularity input frequencies. In general greater dampener action is desired when the vehicle is traversing terrain having widely spaced terrain irregularities; less dampener action is desired when the vehicle is traversing terrain having closely spaced terrain irregularities.

FIG. 7 is a graph plotting some factors that influence or determine desired damping action on oscillatory road wheel motion. In the graph:

$\zeta$ is a damping ratio factor. A low value of $\zeta$ corresponds to low damping; a high value of $\zeta$ indicates high damping, $\omega_n$ is the natural oscillation frequency of the system, $\omega$ is the impressed oscillation frequency due to terrain irregularities, and T.R. is the transmissibility ratio (applicable to force or displacement).

Vehicle ride action is improved by achievement of a low transmissibility ratio, i.e., a decrease in the transmitted force to the sprung mass and human occupants. At relatively low impressed oscillation frequencies $\omega$ a low transmissibility ratio is achieved by using heavy damping, i.e., $\zeta$ factor near 1; at relatively high impressed oscillation frequencies (where $\omega/\omega_n$ is above $\sqrt{2}$) a low transmissibility ratio is achieved by using light damping or no damping, i.e., a $\zeta$ factor near 0. A desirable system is one in which the damping action is inversely varied according to variations in the impressed oscillation frequency, i.e., the frequency of terrain irregularities. In most systems damping is in effect only during jounce (upward) motion of the road wheel. Rebound (downward) motion of the road wheel is undamped.

In general, when the terrain irregularities are close together the road wheel should be capable of relatively fast jounce (upward) motion to keep in step with terrain irregularities; low dampener effect is desired. When the terrain irregularities are more widely spaced a greater dampener effect is required to maintain desired suspension forces and hull position.

In judging or estimating terrain irregularity frequencies it is necessary to consider the effect of vehicle speed. High vehicle speeds effectively cause a given set of terrain irregularities to be relatively close together, while low vehicle speeds effectively cause the same terrain irregularities to be relatively far apart, i.e., a fast-moving vehicle sees a given pattern of terrain irregularities to be closer together than would a slow-moving vehicle.

My invention also takes into account the fact that when a vehicle is required to traverse a high-amplitude terrain irregularity, such as a log or rock, the shock absorber should preferably exert a relatively slight dampener effect during jounce motion, i.e., the road wheel should be capable of relatively fast motion in the jounce direction.

My invention is directed to a vehicle shock absorber wherein the jounce motion dampener action can be varied inversely according to the frequency of terrain irregularities, i.e., a high dampener effect at low terrain irregularity frequencies and a low dampener effect at higher terrain irregularity frequencies. The shock absorber system is preferably designed to anticipate high amplitude terrain irregularities, such as rocks or logs, whereby minimum dampener effect is exerted on the jounce motion while the vehicle is traversing the high amplitude irregularity.

When the invention is applied to a military tank or similar gun-carrying vehicle the shock-absorber system may include control features to increase damping in the suspension system while the gun is being fired, i.e., during recoil and counterrecoil. A highly damped system is believed to contribute to a relatively stable gun platform during on-the-move firing.

In carrying out the invention I incorporate in the individual shock absorbers power-operated metering valves. Electric signals of regulated strength are applied to the valve power operators to reposition the metering valves for either a high flow rate, a low flow rate, or an intermediate flow rate. The metered flow rate determines the rate of fluid flow through the hydraulic shock absorption chamber, and hence the dampener action.

The improved shock absorbers may be manually controlled by the human driver in accordance with the ride action being experienced. Alternately the shock absorbers may be controlled by a computer having electrical inputs reflective of the terrain in the path of the vehicle and/or accelerometer measurement of hull dislocation.

THE DRAWINGS

FIG. 3 illustrates one form that my improved shock absorber can take.

FIG. 4 is a fragmentary view on line 4—4 in FIG. 3.

FIG. 5 fragmentarily illustrates a second form of the invention.

Figure 6:
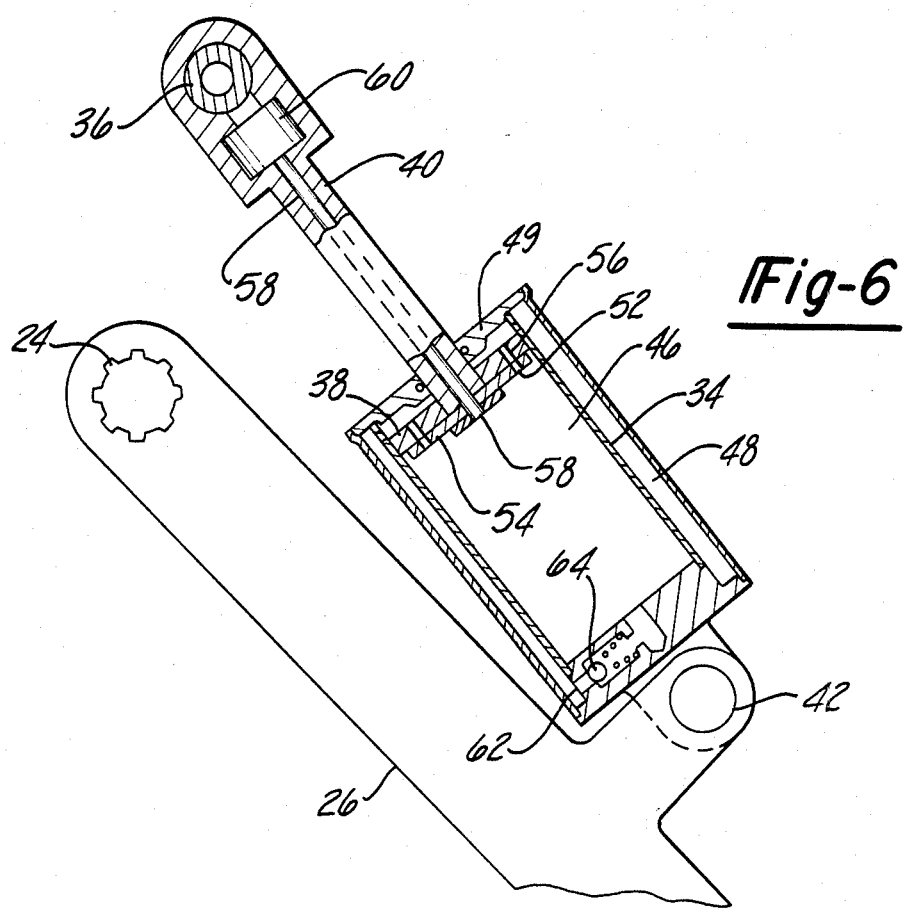

FIG. 6 fragmentarily shows another embodiment of my invention.

Figure 7:
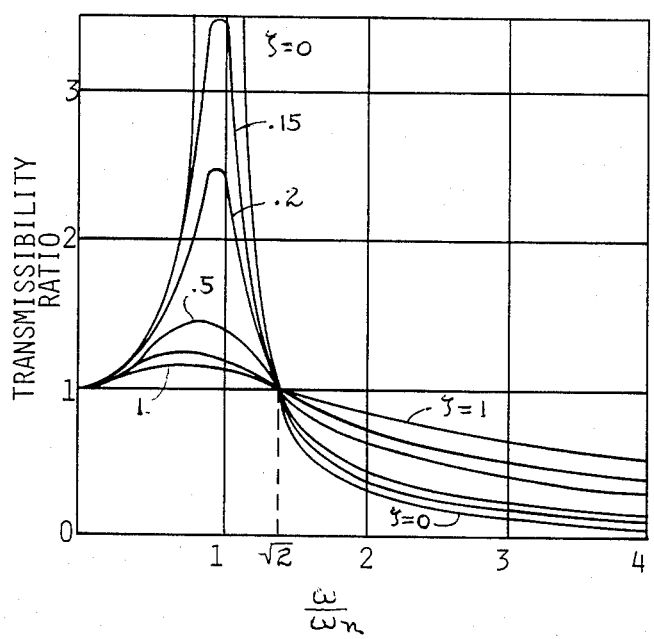

FIG. 7 is a graph plotting various factors that affect displacements of the vehicle sprung mass by terrain irregularities.

Figure 1:
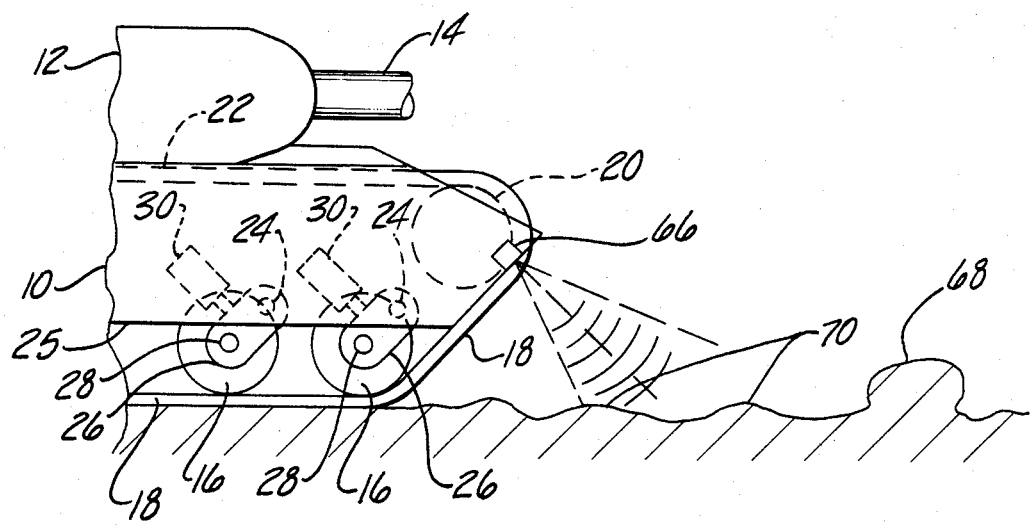
FIG. 1 is a fragmentary side elevational view of a vehicle having a terrain irregularity sensor thereon.

Referring more particularly to FIG. 1, there is shown a tracked military vehicle comprising a hull 10, turret 12, main gun 14, and road wheels 16. Wheels 16 ride on endless tracks 18 that extend around forward idler wheels 20. The upper runs 22 of the tracks extend rearwardly and thence around drive sprockets, not shown. Ordinarily there are five or six road wheels 16 at each side of the vehicle. Various types of spring mechanism are used between individual road wheel and the hull to provide the vehicle suspension force. In the main battle tanks used by the U.S. Army transverse torsion bars provide the suspension force. In FIG. 1 each torsion bar 24 extends transversely across the hull near the hull bottom wall 25. One end of each bar is anchored to the hull. The other end of the bar is affixed (keyed) to a suspension arm 26 that is swingable about an axis coincident with the torsion bar axis. The road wheel is free to rotate on a shaft 28 at the lower end of arm 26.

Selected ones of suspension arms 26 are equipped with hydraulic shock absorber units 30. Normally the first or first and second road wheel(s) and the last road wheel on each side of the vehicle are equipped with shock absorbers. The intervening road wheels are not so-equipped. Damping the motions of these selected road wheels is done primarily for the purpose of minimizing vehicle pitch motion due to low frequency input forces.

My invention is concerned especially with an improved construction for the individual shock absorbers. As illustratively shown in FIG. 3, the improved shock absorber comprises a hydraulic piston-cylinder assembly 32 that comprises piston 38 and cylinder 34. Cylinder 34 is pivotably mounted on a stub shaft or pin 36 extending outwardly from the side wall of hull 10. Co-operating piston 38 is carried on a rod 40 that has pivotal connection 42 with road arm 26. Arm 26 is swingable around an axis 27 coincident with the axis of torsion bar 24. Bar 24 extends transversely through the hull to a non-illustrated anchorage near the opposite hull side wall, so that jounce (upward) motion of arm 26 increases the twist in the torsion bar and thus increases the hull suspension force. Numeral 44 designates the normal motion range of arm 26.

Cylinder 34 is of double-wall construction for defining an inner variable volume chamber 46 and an outer annular liquid reservoir 48. Substantially the entire space encompassed by chamber 46 and reservoir 48 is charged with hydraulic liquid. The upper end of chamber 46 is defined by an insert 50 carried by end wall 49 of cylinder 34. The lower end of chamber 46 is defined by piston 38. During upward (jounce) motion of road arm 26 around swing axis 27 the liquid in chamber 46 is pressurized as piston 38 attempts to move upwardly in piston 34. During downward (rebound) motion of road arm 26 the liquid in chamber 46 is depressurized.

Liquid flow out of chamber 46 takes place through metering ports 52 in a rotary metering valve 54. Ports 52 are alignable with ports 56 in the insert structure 50 so that the effective port area is the overlapping port area. In FIG. 4 clockwise rotation of valve plate 54 tends to bring ports 52 into greater alignment with ports 56, thereby increasing the effective port area. Counter-clockwise rotation of plate 54 tends to reduce the effective port area. Valve plate 54 is carried on shaft 58 of torque motor 60. The value of the electrical signal applied to servo motor 60 determines the rotated position of shaft 58 and thus the effective flow port area of the metering valve means. By varying or adjusting the electrical signal it is possible to change the effective flow port area.

Liquid flow into chamber 46 takes place primarily through passages 62 in piston 38; check valves 64 prevent back flow from chamber 46 to the zone beneath the piston. Some liquid can flow into chamber 46 through metering ports 52. However the metering ports are built to have much lesser flow areas than passages 62. Flow rate into chamber 46 is primarily a function of the size of passages 62. In the illustrated system it is intended that flow into chamber 46 be essentially unregulated, whereby the piston can move downward unimpeded by liquid pressures in the zone below the piston. It is intended that flow out of chamber 46 through metering ports 52 be closely regulated to control rate of motion of piston 38 in the upward (jounce) direction. The electrical signal applied to servo motor 60 determines the effective metering port flow area and hence the rate of motion of piston 38 in the jounce direction. Annular reservoir 48 communicates with passages 62 and the metering ports; the reservoir can thus either supply liquid to chamber 46 or accept liquid from chamber 46, depending on the direction taken by piston 38.

The electrical signal applied to servo motor 60 can be varied by a suitable manual control at the driver's station. With such an arrangement the driver manually adjusts the control in accordance with the experienced vehicle ride action. In general the control would be operated as a function of the terrain undulation frequency. The term "undulation frequency" refers to the effective spacing between individual positive bumps in the terrain. A low terrain undulation frequency equates to a large spacing between individual bumps, whereas a high undulation frequency equates to small spacing between individual bumps. The effective spacing is determined by the physical spacing between bumps and also by the vehicle speed. At high vehicle speeds a given physical spacing will be effectively lessened to provide an effectively high undulation frequency; at low vehicle speeds the same undulation spacing would translate into a low undulation frequency.

In general the driver would actuate the control for the electrical signal to servo motor 60 so that the metered flow through ports 52, 56 is a direct function of the terrain undulation frequency, although not necessarily a constant straight-line relation. At high undulation frequencies, requiring rapid road wheel motion in the jounce direction, the metered flow is relatively large; at low undulation frequencies the metered flow is relatively low for greater dampener effect on the jounce motion. In the illustrated system the wheel rebound motion is unimpeded by the shock absorber; flow through passages 62 is unthrottled.

Figure 2:
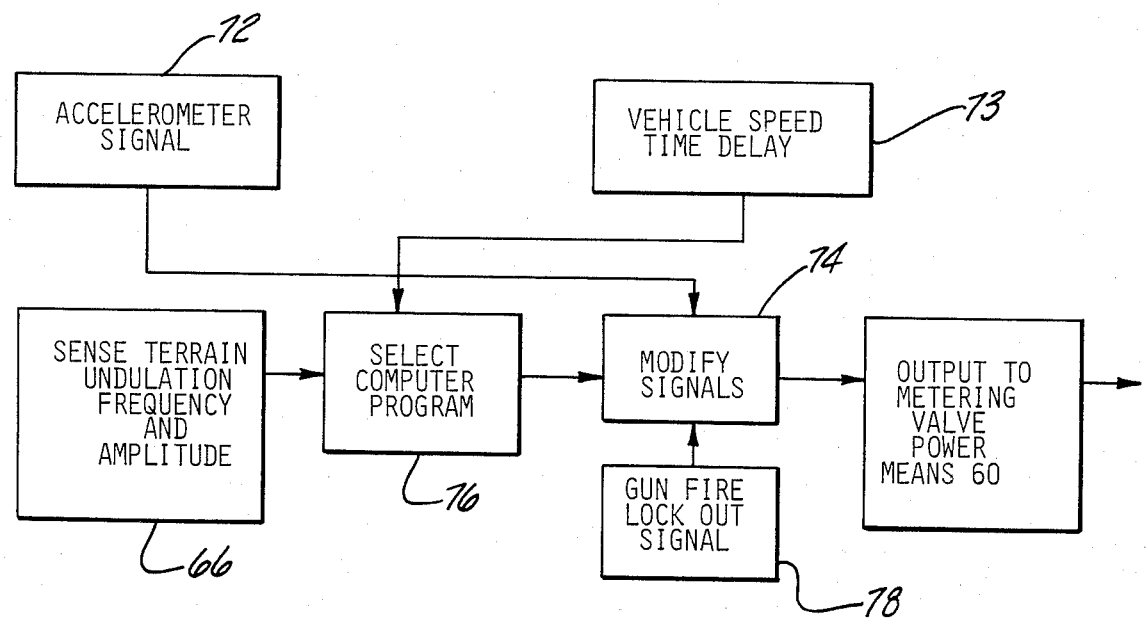
FIG. 2 is a block diagram of a control system usable with my improved shock absorber system.

If desired the electrical signal to servo motor 60 can be controlled automatically by computer-sensor means of the type shown schematically in FIGS. 1 and 2. The sensor mechanism can include radar or sonar devices 66 targeted on the terrain areas in the path of the vehicle, as shown for example in U.S. Pat. No. 3,003,783 to A. Brueder and U.S. Pat. No. 3,625,303 to J. Cameron. Such devices are used herein to sense the terrain undulation frequency and terrain amplitude by measuring the travel time required for emitted radiation pulses to reach individual terrain irregularities and return to the sensor portions of the devices. Terrain amplitude is sensed as the duration of individual pulses. In general small amplitude terrain irregularities produce short duration return pulses, whereas large amplitude terrain irregularities produce long duration return pulses. In FIG. 1 the large amplitude irregularity 68, representative of a log or rock, would produce a longer duration return pulse than the small amplitude pulses 70. Pulse generation rate is preferably of sufficient frequency that vehicle speed does not become a factor in the undulation frequency or amplitude sensing process.

In some situations vehicle pitch motions could cause device 66 to be targeted onto diverse terrain areas rather than a single zone in the vehicle path; this may contribute to erroneous output signals from device 66. The problem may be at least partially overcome by gryo-stabilizing device 66 so that it has a relatively constant sight angle irrespective of vehicle pitch motion.

The sensor 66 output signals may be applied to a computer having a series of stored programs therein. The sensor 66 signals are used as trigger devices to select the appropriate computer program determining the signal to be applied to torque motor 60 (FIG. 3). It is contemplated that program selection will be controlled primarily as a function of the sensed undulation frequency; however when system 66 senses a terrain amplitude above a predetermined value, e.g., six inches, an override signal will be generated in system 66 to put the computer into a condition calling for increased liquid flow by metering means 54.

As a refinement on the control system the computer can have a vehicle speed time delay feature incorporated therein. Vehicle speed measurement signal is generated at 73 and applied to computer 76 to time the computer output so that servo motor 60 operation is in phase with the vehicle position irrespective of vehicle speed.

Hopefully the computer programs are designed and calibrated to deliver the exact signal required to enable motor 60 to provide adjustment of the metering valve necessary to prevent significant vertical dislocations of the vehicle hull. However manufacturing tolerances and design approximations may be such that motor 60 fails to achieve optimum metering valve performance under all operating conditions. It is believed that metering valve performance could be optimized by the use of a feedback signal representative of actual vehicle ride action. In FIG. 2 the accelerometer signal 72, representing hull oscillations in the vertical plane, is applied to a circuit 74 interposed between the computer program selector 76 and servo motor 60. Circuit 74 is used to modify the computer-generated signal in accordance with feedback signals related to actual ride experienced. Should the actual ride be outside the expected or permissible roughness range the computer signal will be appropriately changed to increase the motor 60 response, either less dampener action or more dampener action depending primarily on signal 72 frequency and amplitude; it is expected that higher signal 72 frequencies would call for less liquid dampening, and vice versa.

When the invention is used on a gun-firing vehicle the control system may include a gun fire lock-out signal means 78. During the firing operation the signal means applies an override signal to the control circuit so that torque motor 60 is operated to a zero liquid flow mode while the gun is firing. The action is intended to stiffen the shock absorber system, thereby increasing the stability of the gun platform. The lock-out condition exists for about one or two seconds in a typical situation.

The automatic control system of FIG. 2 is considered an optional feature. The invention is concerned primarily with the electrically-energized power-operated metering valve feature illustrated in FIG. 3. FIGS. 5 and 6 show other forms that the invention can take. FIG. 5 shows a metering means that includes a first continually open port 80, a second relatively small port 82 normally closed by a solenoid valve 83, and a third relatively large port 84 normally closed by a solenoid valve 85. When neither solenoid is energized the flow out of chamber 46 is confined to port 80. Other flow rates can be realized by electrically energizing the solenoid valves, either singly or together.

FIG. 6 shows an arrangement that is similar to the FIG. 3 arrangement except that the metering valve is physically mounted on the piston rather than on the cylinder end wall. In this case torque motor 60 is located on, or in, the piston rod 40 near its pivot connection point. Motor shaft 58 is elongated in order to have the necessary connection with valve plate 54. The metering action is similar to that described in connection with the FIG. 3 arrangement. Lead wiring for the torque motor can be introduced through an axial opening in shaft 36.

I wish it to be understood that I do not desire to be limited to the exact details of construction shown and described for obvious modifications will occur to a person skilled in the art, without departing from the spirit and scope of the appended claims.

I claim:

1. In a vehicle comprising a hull, a series of road wheels individually connected to the hull via swingable suspension arms, and a spring mechanism trained between each suspension arm and the hull to provide the vehicle suspension force: the improvement comprising separate unconnected hydraulic shock absorbers trained between the hull and selected ones of the suspension arms to exert dampener forces thereon during jounce motions of said suspension arms; each shock absorber comprising a liquid reservoir means (48), a cylinder means (34) and a piston (38) reciprocably movable in the cylinder means; said cylinder means and piston defining a variable volume chamber (46) that is pressurized during wheel jounce motion and depressurized during wheel rebound motion; check valve means (64) permitting substantially unrestricted flow into the variable volume chamber during rebound motion; metering valve means (54) controlling hydraulic flow out of the variable volume chamber during jounce motion; said reservoir means communicating with the check valve means and metering valve means to supply liquid to the variable volume chamber or accept liquid from said chamber; the reservoir, chamber, and valve means constituting a closed liquid system; and electrically-energized power means for operating the metering valve means between a high flow position and a low flow position, whereby the suspension arm movement rate can be varied in accordance with an electrical signal applied to said power means; each metering valve means comprising a rotary valve member located within the variable volume chamber in close adjacency to a boundary wall of the variable volume chamber, said rotary valve member and boundary wall having alignable ports (52, 56) therethrough, whereby rotation of the valve member changes the relative alignments of the ports, with corresponding changes in metered flow rate; said electrically-energized power means comprising a rotary servo motor mounted on the shock absorber outside the variable volume chamber; said motor having a rotary output shaft extending through said boundary wall to a driving connection with the rotary valve member.

2. The improvement of claim 1 wherein said boundary wall is formed by the shock absorber piston, said rotary valve member being physically mounted on said piston for movement therewith.

3. The improvement of claim 2 wherein each shock absorber comprises a piston rod having a pivotal connection to the hull, said cylinder means (34) having a pivotal connection to the suspension arm; said motor being mounted on the piston rod near its point of connection to the hull; the motor output shaft extending within the piston rod to a driving connection with the rotary valve member.

4. The improvement of claim 1 wherein each said boundary wall is formed by a chamber end wall (50) remote from the associated piston.

5. The improvement of claim 4 wherein each shock absorber comprises a cylinder means having a pivotal connection to the hull and a piston rod having a pivotal connection to the suspension arm; said motor being mounted on the cylinder means near its point of connection to the hull; the motor output shaft extending through the chamber end wal to a driving connection with the rotary valve member.

* * * * *